Figure 1:
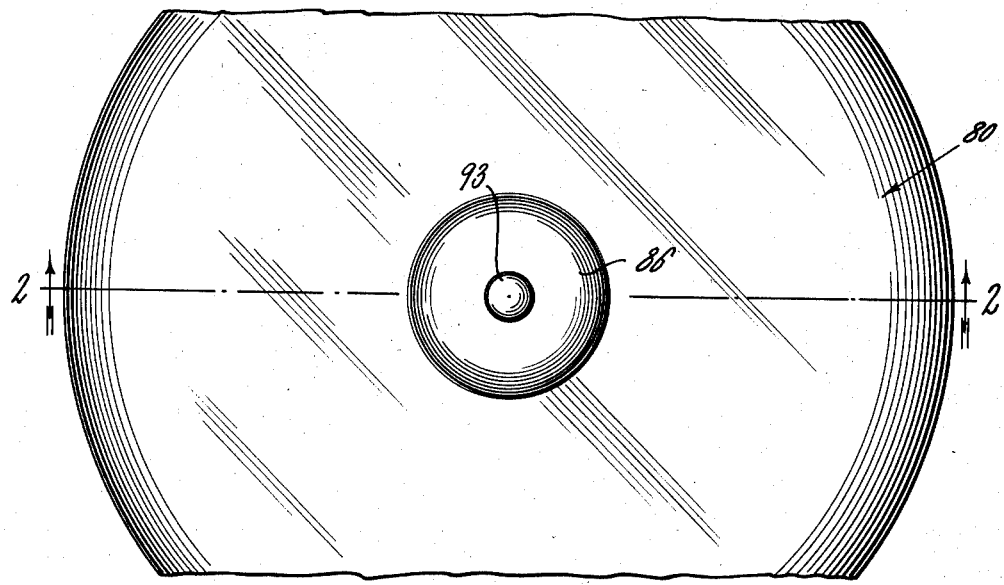

INVENTOR.
RALPH ZIDE

Patented Mar. 3, 1953

2,630,112

UNITED STATES PATENT OFFICE 2,630,112

SIGNAL MEANS FOR PERCOLATORS AND SIMILAR APPLIANCES

Ralph Zide, Brooklyn, N. Y., assignor to Perc-Tone Aluminum Products, Inc., Brooklyn, N. Y., a corporation of New York Application June 29, 1950, Serial No. 171,169

3 Claims. (Cl. 126—388)

This invention relates to percolators and similar kitchen appliances and deals more specifically with the cover construction of such appliances.

It is well known to employ in percolator structures a cover to which is removably connected a top piece or cap made of glass or similar transparent material which permits observing spurts of boiling of water within the percolator pot from therewithout. Thus, a person's attention is attracted by rather visible than audible signals. These top pieces, even if made of heat resistant glass material become easily loose on the cover, are often misplaced and damaged and are subject to replacement.

The present invention overcomes these and other disadvantages and provides means ensuring the manufacture of a simplified cover for kitchen appliances, in particular for percolators, which is integral with the top piece and which is associated with audible and visible signal means.

It is another object of the invention to provide means affording an efficient signal means structure for percolator covers which also guides the boiling mixture of coffee and water and prevents the oily ingredient contained in the coffee from being deposited within the top piece of the percolator cover.

It is a further object of the invention to provide means facilitating easy mounting and regulated position of said signal means within the percolator cover and ready removal of the signal means from the cover for cleaning and similar purposes.

Yet another object of the invention is to provide means permitting predetermined reciprocable movement of the signal means from within the top piece of said percolator cover therewithout.

Still a further object of the invention resides in the provision of means conducive to efficient operation and regulation of visible and audible signal means built in covers of percolators and like kitchen appliances.

With the above and other objects in view, the invention will be hereinafter more particularly described and the combination and arrangement of parts will be shown in the accompanying drawing and pointed out in the claims which form part of the specification.

Figure 2:
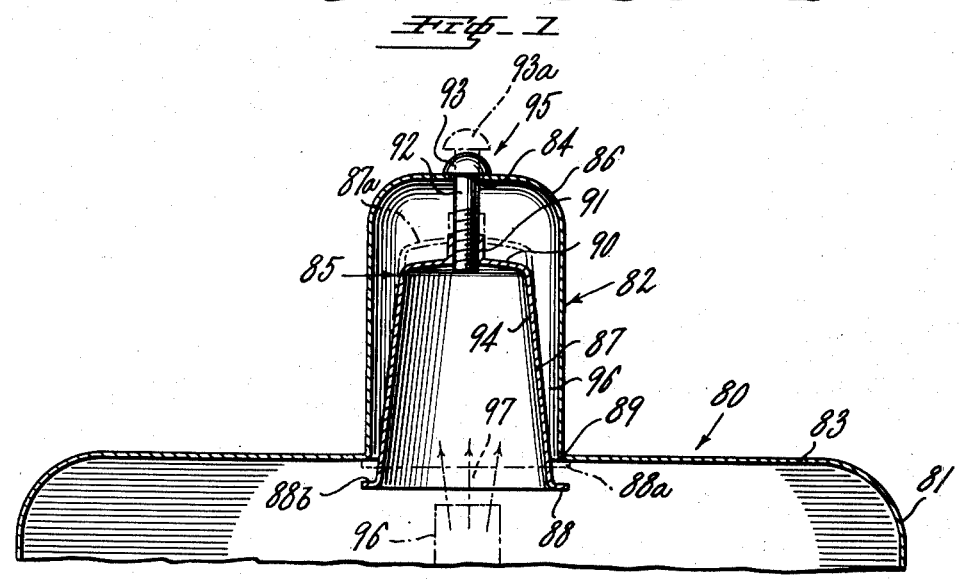

In the drawing:

Fig. 1 is a top plan view of a cover (parts of which being cut off) with signal means, embodying the invention, and Fig. 2 is a sectional view taken along line 2—2 of Fig. 1.

Referring now more particularly to the drawing, there is disclosed a cover 80 having a downwardly extending rim 81 for engagement with the percolator pot (not shown) and further a centrally disposed hollow cover extension or top piece 82. In this top piece 82, which is integral with upper cover part 83 and preferably manufactured through stamping operation, is accommodated the signal means 85 for movement through opening 84 provided in the upper wall 86 of top piece 82.

The signal means 85 comprises the dish-shaped and upside down turned thimble member 87 terminating in a relatively wide lower flange or abutment brim 88 whose dimension is large enough to abut against the lower end 89 of top piece 82 as indicated at 88a by dot-dash lines.

The upper wall 90 of thimble member 87 has a threaded extension or sleeve 91 adapted to engage with the threaded rod 92 of a rivet-like element 95 which terminates in a head 93 normally seated on the outer surface of upper wall 86 of top piece or cover extension 82.

It will be readily recognized that upon impingement of fluid or boiling liquid on the interior wall 94 of member 87 the latter is moved in a reciprocable manner first to upper position indicated at 87a, in which position head 93 will assume its limit position at 93a. Since the coffee and water mixture is forced in spurts out of stem 96 (extending a predetermined height from within the percolator pot into cover 80) against the inner face 94 of thimble member 87, it will be readily realized that a reciprocable movement of the signal means 85 is attained, which is audible due to the fact that member 87 abuts by means of flange 88 against said lower end 89, while in opposite direction head 93 comes to abut against the outer surface of upper wall 86, where besides the audible signal (due to abutting engagement) also a visible signal is achieved.

Opening 84 may be large enough to let rod 92 pass with ease. In view of the fact that the stroke of member 87 relatively to abutment end 89 may be regulated the sound of the signal means 85 may be somewhat changed or varied.

It is to be observed that the downwardly flared hollow member 87 does not serve as a valve but receives spurts of the periodically moving boiling substance and that the lower brim or flange 88 is so dimensioned and shaped that it will normally not permit oily ingredients of the boiling coffee substance to settle down for deposit on and adherence to the walls defining space 96 or on the flange surface 88b. The direction of boiling water or like fluid is indicated by arrows 97 in Fig. 2.

It is well understood that although, as shown in the drawing, the dish-shaped body 87 is formed to substantially telescopically move with respect to the cover extension or top piece 82 the body may assume another shape or configuration and may be shallow rather than recessed to an extent as shown in the drawing.

The body may readily be removed from threaded rod member 92 for the purpose of interchangeability with another type of hollow body and further for cleaning purposes while the interior wall of the extension or top piece 82 is accessible.

The threaded engagement between the body 87 and rod member 92 serves further the purpose of allowing to change or regulate the stroke (88—88a and 93—93a) of the signal means 85 in upward and downward directions. If the stroke of the signal means would be too large then the periodically upwardly ejecting parts of the boiling substance (from stem 96) could possibly interfere with the desired reciprocal movement (up and down movement) of body 87. Therefore, body 87 should be conformed to the particular height of the hollow percolator stem 96 and also to the desired degree and length of time within which the boiling substance is to be ejected from hollow stem 96 to thereby impart sufficient movement to said signal means 85.

In other words, if the boiling coffee-water substance is not as yet strongly agitated during the start of the boiling process and for a certain period of time subsequently thereto a deep-drawn and hollow body 87 will be less affected thereby and put to motion than a relatively shallow body.

The cover and top piece or extension may be made from any suitable material, such as metal, plastic, plastic composition, etc. The signal means may also be made from metal as is well understood. It can thus be seen that there has been provided in accordance with this invention a cover for percolators and like kitchen appliances comprising an elongated hollow top piece positioned centrally of and integral with said cover, said top piece terminating in a top wall having a perforation, and signal means adapted to move in lengthwise direction of said top piece and extending through said opening from within said top piece therewithout, said signal means including a dish-shaped body adapted for contact with a portion of said cover, and a rod member connected to said dish-shaped body and passing through said opening, said rod member terminating in a head element positioned without said top piece for contact with said top wall, whereby upon movement of said body in one direction caused by boiling substance from below said cover against said body the latter abuts against said cover portion, whereas upon subsequent movement of said body in opposite direction said head element abuts against said top wall and thereby produces a visible and audible signal.

While one embodiment of the invention has been shown and described, it will be easily understood that the same is capable of modification without departure from the general scope and spirit of the invention as defined in the claims.

Having thus described the invention, what is claimed as new and desired to be secured by Letters Patent, is:

1. A cover for percolators and like kitchen appliances comprising an elongated hollow top piece positioned centrally of and integral with said cover, said top piece terminating in a top wall having a perforation, signal means adapted to move in lengthwise direction of said top piece and extending through said opening from within said top piece therewithout, said signal means including an elongated dish-shaped body extending from said cover into said hollow top piece and adapted for contact with a portion of said cover below said top piece, and a rod member connected to said dish-shaped body and passing through said opening, said rod member terminating in a head element positioned without said top piece for contact with said top wall, whereby upon movement of said body in one direction caused by boiling substance from below said cover against said body the latter abuts against said cover portion, whereas upon subsequent movement of said body in opposite direction said head element abuts against said top wall and thereby produces a visible and audible signal.

2. A cover according to claim 1, wherein said rod member extends between said top wall and the upper end of said body and is provided with threads engaging said upper end only of said body, to thereby adjust the extent of movement of said body relative to said cover.

3. A cover according to claim 1, wherein said body is provided with a flange extending laterally beyond said top piece for abutment against said cover portion.

RALPH ZIDE.

REFERENCES CITED

The following references are of record in the file of this patent:

UNITED STATES PATENTS

| Number | Name | Date |
|---|---|---|
| 711,385 | Coyle | Oct. 14, 1902 |
| 848,816 | Duerr | Apr. 2, 1907 |
| 967,954 | Morrison et al. | Aug. 23, 1910 |
| 1,128,242 | Gillis | Feb. 9, 1915 |
| 1,648,407 | Kumagai | Nov. 8, 1927 |

FOREIGN PATENTS

| Number | Country | Date |
|---|---|---|
| 25,832 | Great Britain | of 1896 |
| 101,987 | Switzerland | Nov. 1, 1923 |